United States Patent [19]

Rinella

[11] 4,114,315

[45] Sep. 19, 1978

[54] PROCESS FOR GROWING ALFALFA SPROUTS FROM SEED AND APPARATUS THEREFOR

[76] Inventor: Pamela A. Rinella, Box 682, Mt. Lemmon, Ariz. 85619

[21] Appl. No.: 839,409

[22] Filed: Oct. 5, 1977

[51] Int. Cl.² ............................................. A01G 31/02
[52] U.S. Cl. ............................................. 47/61; 47/16
[58] Field of Search ........................... 47/14, 16, 60–61

[56] References Cited

U.S. PATENT DOCUMENTS

| | | | |
|---|---|---|---|
| 2,040,161 | 5/1936 | Widmann | 47/61 |
| 2,051,094 | 8/1936 | Loughridge | 47/61 |
| 2,121,461 | 6/1938 | Widmann | 47/61 |
| 2,169,701 | 8/1939 | Lund | 47/61 |
| 2,522,409 | 9/1950 | Stoller | 47/14 X |
| 3,643,376 | 2/1972 | Poindexter et al. | 47/61 |

*Primary Examiner*—Robert E. Bagwill
*Attorney, Agent, or Firm*—Cahill, Sutton & Thomas

[57] ABSTRACT

The temperature and wetness of alfalfa seeds are varied during specified time periods to bring about germination in 48 hours. After germination, the alfalfa sprouts are exposed for 192 hours to an environment of regulated and varying temperature, humidity and light intensity to produce maximum growth and nutritional value. Thereby, alfalfa sprouts, high in nutritional value and suitable for human consumption, can be grown from seeds during a 240 hour period.

9 Claims, 3 Drawing Figures

PROCESS FOR GROWING ALFALFA SPROUTS FROM SEED AND APPARATUS THEREFOR

The present invention relates to horticultural processes and, more particularly, to a process and apparatus for growing from seed harvestable alfalfa sprouts suitable for human consumption.

Alfalfa is a leguminous plant native to Southwestern Asia. Since the Roman civilization, it has been extensively cultivated and is an important perennial forage plant. In its normal full growth state, it has an extremely deeply penetrating root system reaching down 25 feet or more and is admirably adapted for growing in dry lands where resistance to drought is important. Its flowers are also an important source of honey.

Until recent years, an alfalfa sprout, the tap root emerging from a seed, has not been considered an important source of food. Consequently, alfalfa sprouts have been of little commercial value. Contributing to their lack of widespread use as a food high in nutritional value has been the special problems attendant the cultivation of alfalfa sprouts on a commercial basis.

It is therefore a primary object of the present invention to provide a process for growing harvestable alfalfa sprouts.

Another object of the present invention is to provide a process for growing alfalfa sprouts having high nutritional value and suitable for human consumption in the minimum time period.

Yet another object of the present invention is to provide a process for growing alfalfa sprouts which optimizes, during the two primary growth phases, temperature, humidity and light environmental conditions to achieve maximum growth rate.

Still another object of the present invention is to provide a process for germinating alfalfa seeds within a 48 hour period and cultivating harvestable alfalfa sprouts within an ensuing 192 hour period.

A further object of the present invention is to provide a process for producing a harvestable crop of alfalfa sprouts from seed within a 240 hour period.

A yet further object of the present invention is to provide apparatus for establishing an environment within which harvestable alfalfa sprouts can be inexpensively grown from seed within 240 hours.

A still further object of the present invention is to provide inexpensive apparatus which is capable of providing the varying environmental conditions for growing alfalfa sprouts from seed.

A still further object of the present invention is to provide an inexpensive apparatus for simultaneously growing several crops of alfalfa sprouts.

These and other objects of the present invention will become apparent to those skilled in the art as the description thereof proceeds.

The present invention will be described with greater specificity and clarity with reference to the following drawings, in which.

Figure 1:
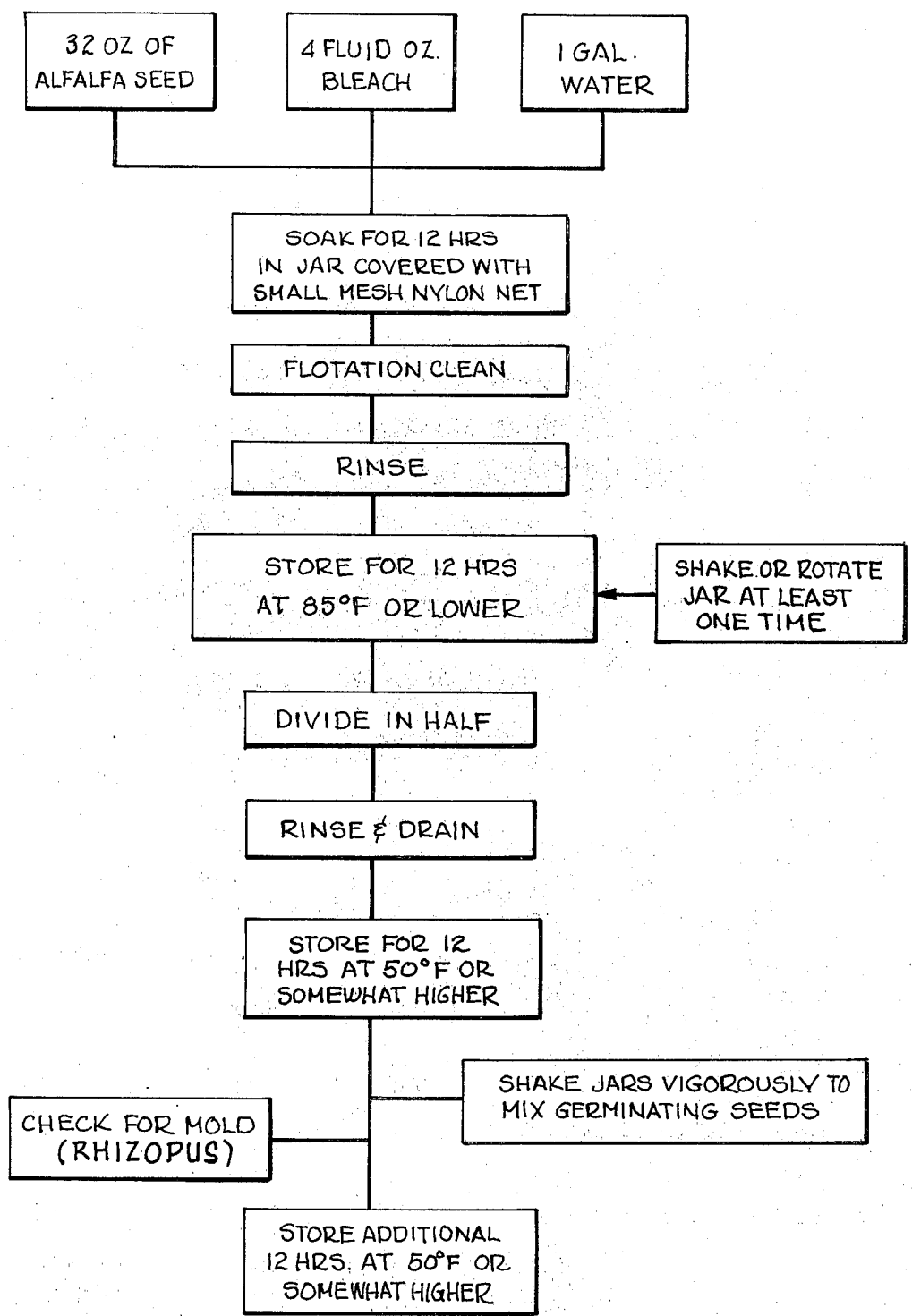
FIG. 1 is a flow diagram illustrating the steps employed in achieving germination of alfalfa seeds.
Figure 2:
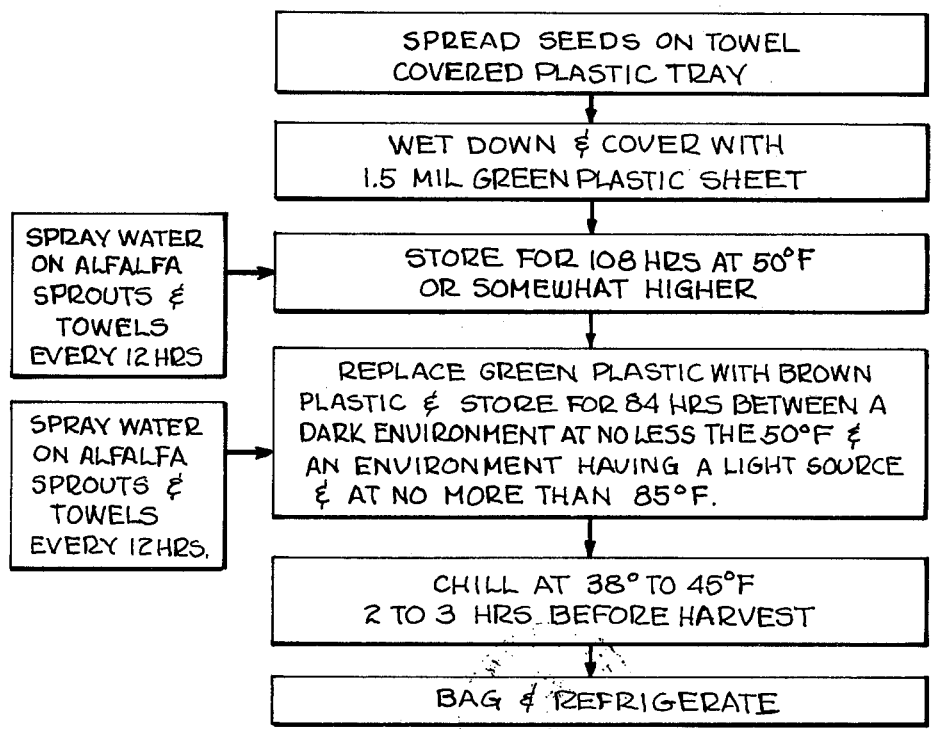
FIG. 2 is a flow diagram depicting the steps for growing germinated alfalfa seeds to nutritional harvestable size alfalfa sprouts.

The process for growing harvestable alfalfa sprouts from seed includes two segregable phases. The first phase achieves germination of the seed within a 48 hour period. The second phase cultivates the germinated seeds to harvestable sized alfalfa sprouts high in nutritional value and suitable for human consumption.

The first step of the first phase is that of combining 32 ounces, dry weight, of alfalfa seed with 4 fluid ounces of commercial bleach in a 1 gallon jar having a rim. The jar is filled to the top with cold water. The seeds are soaked for 12 hours in the jar after the jar top has been covered with small mesh nylon net secured in place with a rubber band about the rim. At the end of the soaking period, the water is drained from the seeds and thorough cleansing of the seed by using a floatation method is undertaken. At least one rinsing and draining of the seeds is performed and all water is to be removed during the last drain.

After the water has been removed, the jar is placed at a location having a uniform constant temperature close to but not exceeding 85° F. for a 12 hour period. During this step, the jar should be shaken or rotated at least once to keep the seeds evenly moist and exposed to the oxygen within the jar. Further shaking or rotation of the jar may be necessary to preclude the seeds from packing. At the end of the 12 hour period, the seeds are divided in half, leaving one-half of the seeds in the original jar and placing the remaining half in a similar jar. Thereafter, both jars of seed are rinsed and drained to remove all excess water.

On removal of all excess water, the tops of the jars are covered with small mesh nylon net and placed in an environment having a temperature close to but not below 50° C. for a period of 12 hours. On completion of the twelve hour period, each jar is shaken to thoroughly mix the germinating seeds. A high degree of heat is produced during this 12 hour germination period and this heat, along with decreasing amounts of oxygen, encourages the growth of a common bread mold known as rhizopus. Accordingly, care should be taken to avoid conditions which encourage the growth of this mold. Should the mold be present, it will be noted on the young sprouts as a spiderweb-like growth with an accompanying odor of ammonia. Any such affected sprouts must be discarded.

After thoroughly mixing the germinating seeds, as described above, the jars are returned once again to the 50° F. environment and the seeds are allowed to germinate for an additional 12 hour period. Thereafter, the seeds will have germinated and phase one of the process will have been completed.

Phase two contemplates the growing of the germinated seeds or alfalfa sprouts. Prior to termination of phase one, the apparatus for supporting the alfalfa sprouts must be made ready. Such apparatus may include terry cloth towels or similar cotton fabric which has a tight weave, is thick and is absorbent. Some types of synthetic non-fuzzy thick blankets or fabric may be used. The towels (or fabric) are placed on plastic trays approximately 26½ inches long, 21½ inches wide and 1 inch deep.

After the towels are in place on the trays, the alfalfa sprouts are evenly spread across the towels. If the tray size described above is used, the alfalfa sprouts within each jar is placed upon one towel covered tray. The tray and its contents are sprayed with water until the sprouts are wet and the towels are completely soaked.

Each filled and wetted tray is covered with a sheet of 1½ mil (0.0015inch) thick green plastic. The color is relatively important in that of the various colors of commercially available plastic sheets tried, only green plastic, such as the type sold as garbage bags, precludes light penetration. Additionally, the plastic sheet is relatively light to permit air circulation around and about the alfalfa sprouts while precluding flow of moisture through the sheet.

The covered trays are placed in an environment having a temperature close to but not below 50° F. Every twelve hours for the next 108 hours, the trays are sprayed with water. For best results in low humidity conditions, the alfalfa sprouts may be sprayed three times during the first 24 hours. Should the sprouted seeds become dry during the first 48 hours, the whole crop may be lost.

On completion of the 108 hour period, the sheets of green plastic are replaced with similar sheets of plastic, brown or beige in color. The change in color is predicated upon the requirement during the succeeding 84 hour growth period for exposure to light. Because the light intensity to which the sprouts are to be subjected must be low, clear plastic should not be used. For the next 84 hour period, each tray is alternated during consecutive 12 hour periods between an essentially dark environment at a temperature close to but not below 50° F. and an environment having a source of light and at a temperature close to but not exceeding 85° F. Care should be taken to insure that exposure to light does not exceed twelve hours; otherwise, the growth may be stunted or the alfalfa sprouts may be burned. During each twelve hour transfer of a tray, the sprouts and supporting towel must be sprayed with water to wet the sprouts and towel; however, the degree of wetness can be tapered off toward the end of the period to a point of just dampening the towels. This precaution will reduce the probability of spoilage.

The maximum growth and highest nutritional value is achieved in 192 hours during phase two.

By experimentation, it has been learned that alfalfa varieties such as Hayden, Mesa Sirsa or Moapa provide the best results.

In order to insure freshness and maximum preservation of the alfalfa sprouts between harvestime and time of consumption, several guidelines should be followed. First, the alfalfa sprouts should not be sprayed within 12 hours prior to harvest. Instead, 2 to 3 hours before harvest, the alfalfa sprouts should be chilled to a temperature in the range of 38° to 45° C.; alternatively, bagged sprouts may be chilled before shipping. Because of a propensity for the alfalfa sprouts to rot quickly if not refrigerated, they should be kept cold or otherwise refrigerated until just before consumption. If these precautions are followed, the alfalfa sprouts will have a shelf life of fourteen to seventeen days.

In the event the towels are to be repetitively used for succeeding crops of sprouts, several precautions must be taken to preclude contamination or deterioration of the succeeding crops. The towels should be shaken free of excess alfalfa sprouts, then laundered with hot water and small quantities of detergent and bleach. After washing, excess lint should be shaken free.

Figure 3:
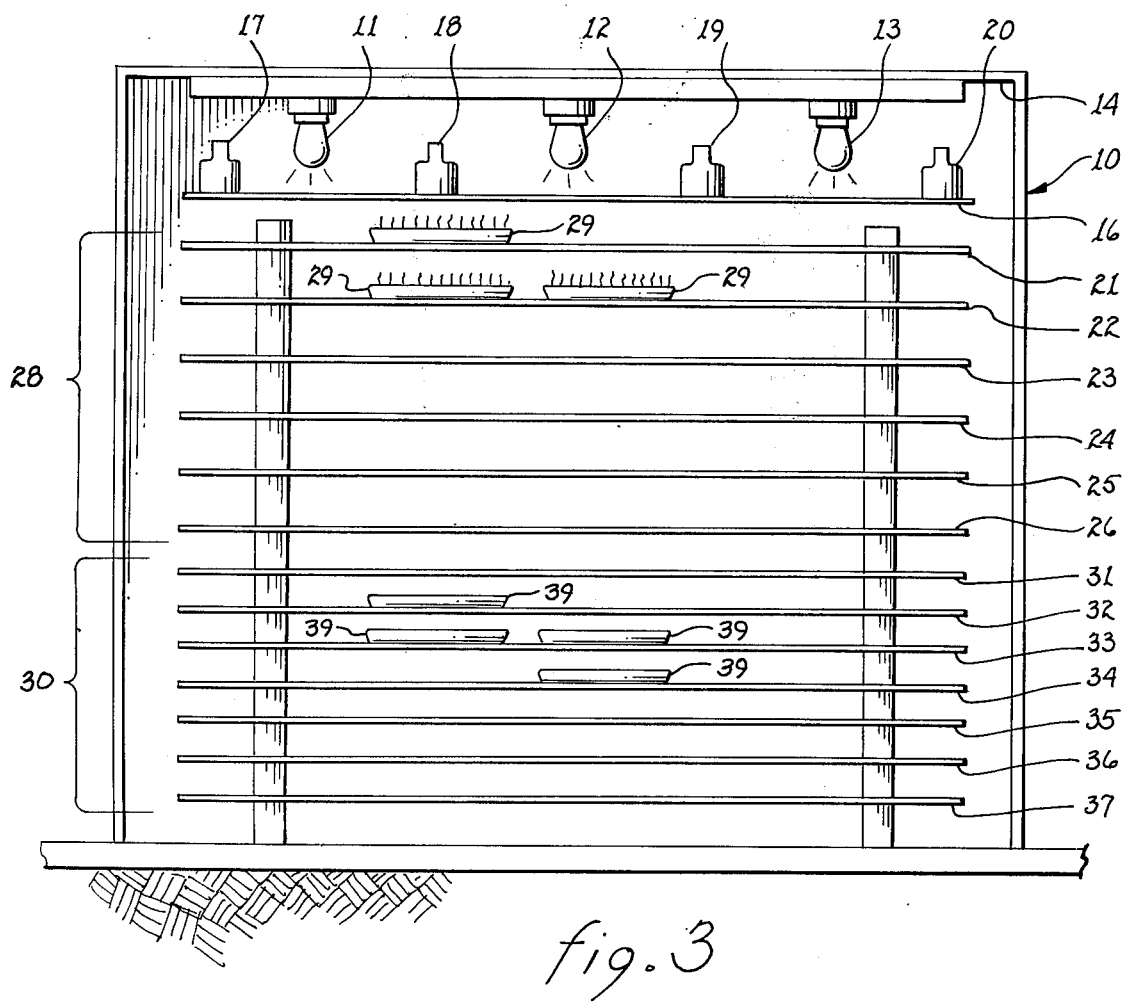
FIG. 3 illustrates apparatus for creating the environmental conditions to cultivate and grow alfalfa sprouts from germinated seeds.

Referring to FIG. 3, there is illustrated an enclosure 10 representative of a specially configured chamber within which the above described process may be readily practiced. A plurality of light bulbs 11, 12 and 13 are suspended from ceiling 14. Preferably these bulbs are 100, 150 or 250 watt clear (uncoated) light bulbs and in sufficient quantity to maintain the temperature of the upper part of the chamber at but not in excess of 85° F. A shelf 16 is located beneath the light bulbs and is of a sufficient width to support the 1 gallon jars 17-20 used in phase one to germinate the seeds.

A plurality of shelves 21, 22, 23, 24, 25 and 26 constitute an upper level of shelves 28. These upper level shelves support trays 29 employed in phase two of the above described process to maintain the sprouts at a temperature not exceeding 85° F. and subject to light from light bulbs 11, 12 and 13. Nominally, these shelves are 20 inches deep and vertically spaced at 7 inch intervals.

A plurality of lower level shelves 30, including shelves 31, 32, 33, 34, 35, 36 and 37, and nominally spaced four inches apart, are located in a lower part of enclosure 10. These shelves are used during phase two of the process for maintaining the alfalfa sprout loaded trays 39 at or close to 50° F.

In conclusion, all of the steps of the above described process for growing alfalfa sprouts can be readily undertaken in a relatively small sized chamber, depending to some extent upon the size of the crop desired. Additionally, several crops can be simultaneously grown within the same chamber even though each of these crops may be cyclically distinct from every other crop. Thus, it is very feasible to harvest a crop every 12 hours from the same chamber.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A process for growing alfalfa sprouts from seed, said process comprising the steps of:
   I. germinating the seeds, said step of germinating comprising the steps of:
      a. soaking the seeds in a solution of water and bleach;
      b. rinsing the soaked seeds;
      c. storing the rinsed seeds at a first temperature range;
      d. rinsing and draining the stored seeds;
      e. storing the rinsed and drained seeds at a second temperature range lower than the first temperature range;
   II. growing the alfalfa sprouts from the germinated seeds, said step of growing comprising the steps of:
      a. spreading the alfalfa sprouts upon a supporting surface;
      b. wetting the spread alfalfa sprouts;
      c. covering the wetted alfalfa sprouts to shield them against light without inhibiting a flow of air around and about the covered alfalfa sprouts;
      d. storing the alfalfa sprouts at the second temperature range;
      e. periodically wetting the stored alfalfa sprouts during said storing step;
      f. recovering the stored alfalfa sprouts with light penetrable cover;
      g. cyclically transferring the recovered alfalfa sprouts from a dark environment at the second temperature range to an environment at the first temperature range and having a source of light;

h. periodically wetting the recovered alfalfa sprouts during said step of transferring; and i. harvesting the alfalfa sprouts.

2. The process as set forth in claim 1 including the step of shaking the germinating seeds during each said step of storing.

3. The process as set forth in claim 1 wherein said soaking step and said storing step of the rinsed seeds are each conducted for a 12 hour period and wherein said storing step of said rinsed and drained seeds is conducted for a 24 hour period.

4. The process as set forth in claim 3 wherein said storing step of the alfalfa sprouts is conducted for a 108 hour period.

5. The process as set forth in claim 4 wherein said transferring step is conducted during an 84 hour period.

6. The process as set forth in claim 5 wherein each cycle of said transferring step comprises a 12 hour period.

7. The process as set forth in claim 6 wherein said step of wetting the recovered alfalfa sprouts is conducted simultaneous with each cycle of said transferring step.

8. The process as set forth in claim 7 wherein the first temperature range is approximately but not more than 85° F and the second temperature range is approximately but not less than 50° F.

9. The process as set forth in claim 8 wherein said step of spreading includes the step of placing a water absorbent element upon the supporting surface and beneath the alfalfa sprouts.